No. 806,961. PATENTED DEC. 12, 1905.
C. F. DRAKE.
WATER METER.
APPLICATION FILED MAR. 27, 1905.
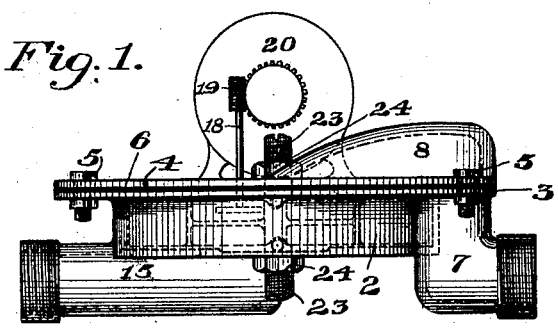
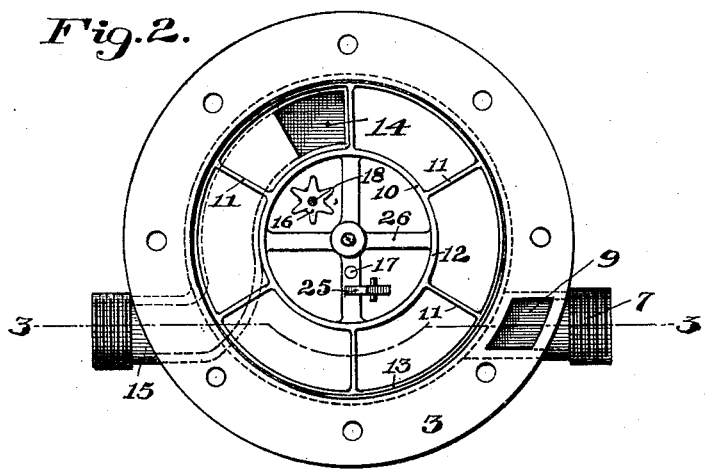
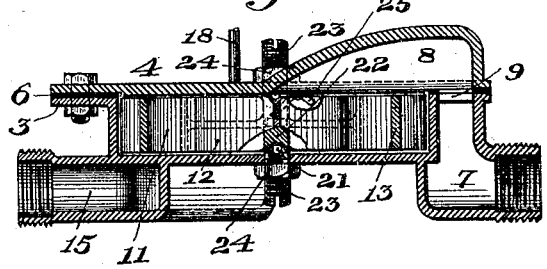
WITNESSES
INVENTOR
Chester F. Drake
by James K. Bakewell
his Attorney

UNITED STATES PATENT OFFICE.

CHESTER F. DRAKE, OF PITTSBURG, PENNSYLVANIA, ASSIGNOR TO THOMAS A. MELLON AND EDWARD P. MELLON, OF PITTSBURG, PENNSYLVANIA.

WATER-METER.

No. 806,961.     Specification of Letters Patent.     Patented Dec. 12, 1905.

Application filed March 27, 1905. Serial No. 252,142.

*To all whom it may concern:*

Be it known that I, CHESTER F. DRAKE, of Pittsburg, in the county of Allegheny and State of Pennsylvania, have invented a new and useful Water-Meter, of which the following is a full, clear, and exact description, reference being had to the accompanying drawings, forming part of this specification, in which—

Figure 1 is an elevation illustrating my invention and showing parts of the interior construction of the meter by dotted lines. Fig. 2 is a plan view of the same, the cap-plate being removed; and Fig. 3 is a vertical sectional view on the line 3 3 of Fig. 2, a portion being broken away to show the ball-bearing adjustment.

My invention relates to that class of meters employed to measure the flow of liquids; and its object is to provide a meter simple in its parts, accurate in measurement, and free from liability to leakage.

I will now describe my invention, so that others skilled in the art to which it appertains may manufacture and use the same.

In the drawings, 2 represents the shell or casing of the meter. This casing, which may be formed of any suitable material, is in the form of a shallow cylinder having an annular flange 3, to which the cap-plate 4 is secured by the bolts 5, a suitable packing 6 being interposed. Leading to and opening through the flange 3 from a point below the same is the elbow pipe or conduit 7, which is connected with the liquid-supply conduit.

Formed on or secured to the cap-plate 4 is a fluid-conduit 8, which when the cap-plate is in position communicates with the mouth 9 of the conduit 7 and leads horizontally above the plate 4 to a point over the cylindrical portion, where it opens into the cylinder 2 on a line tangential thereto.

Within the cylinder 2 is a turbine-wheel 10, having flat wings 11, that extend between the two concentric rings 12 and 13 and are fixed to or relatively not movable with relation to the rings. These rings and the wings 11 are equal in height and extending between the bottom of the cylinder 2 and the cap-plate 4, make a close joinder with the same.

Opening through the bottom of the cylinder 2 is a fluid-conduit 14, which extends back below the floor of the cylinder to a point on a line with the elbow 7, where it forms the elbow 15, which discharges on the line of the liquid-supply conduit into the service-pipe.

Within the cylinder 2 is the star-wheel 16, which is given a partial rotation at every rotation of the turbine-wheel by the pin 17. This star-wheel is keyed to the shaft 18, on the outer end of which is the worm 19, which meshes with the gear of the register 20.

The turbine-wheel 10 is provided with ball-bearings 21, the lower one of which is shown in Fig. 3, which bearing is formed between the hub 22 of the wheel and a plug 23, which screws into the bottom of the cylinder and is locked by the nut 24. The ball 21 rests in a cavity formed in the hub and in the plug, and this bearing may be tightened or loosened by the nut 24. The purpose of this adjustable ball-bearing is to take up any wear that may take place between the wings and the top and bottom plates of the casing. This is done by adjusting the nuts 24 in the cap-plate 4 and the bottom of the cylinder 2 and then tightening the bolts 5, which secure the cap-plate 4 to the casing 2. The bearing in the cap-plate 4 is exactly the same as the one in the bottom of the cylinder 2.

The two elbows 7 and 15 are so arranged that the pipe leading to the meter and the pipe leading therefrom shall be on the same line.

The operation is as follows: As water or other liquid is drawn from the service-pipe the liquid will flow through the elbow 7, and passing into the cylinder 2 it will strike the wings 11 and cause the turbine-wheel to rotate on its axis. As the turbine-wheel rotates the pin 17 moves the star-wheel and registers the volume of liquid that passes through the meter. When the water reaches the conduit 14, it passes out of the cylinder 2 to the elbow 15. Owing to the fact that the two rings 12 and 13, with the wings 11, form pockets and the fitting of the rings and wings closely against the bottom of the cylinder and the cap-plate, leakage and consequent by-passing of the liquid through the meter are prevented. By grinding the faces of the cap-plate and the bottom of the cylinder and by adjusting the ball-bearings and tightening the bolts 5 absolutely tight joints may be secured without interfering with the free movement of the turbine-wheel and without the use of packing between the wings 11 and the cylinder 2.

The advantages of my invention result from the double concentric rings and the fixed wings together forming pockets and obviating the use of packing, the adjustable ball-bearings and the supply and service pipes extending to and from the meter on the same line. The meter is compact, simple, and not liable to get out of order. It is also accurate in its measurement.

To prevent the meter from being run backward, an L-shaped arm 25 is so pivoted as to extend in the path of the spokes 26 of the wheel 10 and to swing out of the way on the forward movement of the same. Should it be attempted to run the wheel in the reverse direction, the other arm of the L would strike the cap-plate and prevent the arm from swinging out of the path of the spokes.

Having thus described my invention, what I claim, and desire to secure by Letters Patent, is—

1. In a meter, the combination of a casing, consisting of a top and bottom plate and an annular ring or flange, a turbine-wheel having inner and outer rings and flat wings extending between the rings and extending between the top and bottom plates of the casing, said wings being motionless relatively to the two rings, and inlet and outlet ports, the inlet-port opening into the casing tangentially to the periphery of the same; substantially as specified.

2. In a meter, the combination of a casing consisting of an upper and lower plate, and an interposed flange or ring, a turbine-wheel having concentric rings, and wings extending radially between the rings, said wings being motionless relatively to the rings, the rings and wings extending between the two plates of the casing, ball-bearings supporting the turbine-wheel in the casing, and means for adjusting the ball-bearings and the casing in relation to the turbine-wheel; substantially as specified.

3. In a meter, the combination of a casing consisting of an upper and lower plate and an interposed ring or flange, supply and service pipe sockets extending from the meter-case on the same tangential line at or below the base of the meter-case, and a turbine-wheel having concentric rings and wings extending radially between the rings and motionless relatively thereto; substantially as specified.

4. In a meter, the combination of a meter-case having an upper and lower plate and an interposed ring or flange, a turbine-wheel, consisting of concentric rings and radial wings so arranged as to form pockets, and inlet and outlet ports so located in the casing that fluid cannot pass from one to the other without moving the turbine-wheel; substantially as specified.

5. In a meter, a casing consisting of an upper and a lower plate, having an intervening flange or ring, a turbine-wheel consisting of concentric rings and radial wings, inlet and outlet sockets extending radially from the casing, and a pivoted arm extending in the path of the spokes of the turbine-wheel to prevent the backward movement of the same; substantially as specified.

In testimony whereof I have hereunto set my hand.

CHESTER F. DRAKE.

Witnesses:
 GEO. B. BLEMING,
 JAMES K. BAKEWELL.